US012763311B2

(12) United States Patent
Choi et al.

(10) Patent No.: US 12,763,311 B2
(45) Date of Patent: Oct. 13, 2026

(54) APPARATUS FOR MANUFACTURING BATTERY CELL

(71) Applicant: SK On Co., Ltd., Seoul (KR)

(72) Inventors: Gil Yong Choi, Daejeon (KR); Joo Hyung Kim, Daejeon (KR); Hyung Joon Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 1028 days.

(21) Appl. No.: 17/690,903

(22) Filed: Mar. 9, 2022

(65) Prior Publication Data

US 2022/0293903 A1 Sep. 15, 2022

(30) Foreign Application Priority Data

Mar. 10, 2021 (KR) ........................ 10-2021-0031421
Feb. 25, 2022 (KR) ........................ 10-2022-0025117

(51) Int. Cl.
*H01M 4/04* (2006.01)
*H01M 50/186* (2021.01)

(52) U.S. Cl.
CPC ....... *H01M 4/0435* (2013.01); *H01M 50/186* (2021.01)

(58) Field of Classification Search
CPC ............. H01M 4/0435; H01M 50/186; H01M 50/105; H01M 10/0404; H01M 10/04; Y02E 60/10
See application file for complete search history.

(56) References Cited

U.S. PATENT DOCUMENTS

2014/0182119 A1* 7/2014 Otohata .............. B29C 66/0324 29/623.2

FOREIGN PATENT DOCUMENTS

| | | | | | |
|---|---|---|---|---|---|
| CN | 207116593 | U | | 3/2018 | |
| EP | 3799180 | A2 | | 3/2021 | |
| JP | H5-329555 | A | | 12/1993 | |
| KR | 10-2017-0033588 | A | | 3/2017 | |
| KR | 20170033588 | A | * | 3/2017 | |
| KR | 20170053011 | A | * | 5/2017 | ........ H01M 10/0431 |
| KR | 10-2018-0010563 | A | | 1/2018 | |
| KR | 10-1958882 | B1 | | 3/2019 | |
| KR | 20210030591 | A | * | 3/2021 | ........ H01M 10/0413 |

OTHER PUBLICATIONS

Partial European Search Report for the European Patent Application No. 22160934.0 issued by the European Patent Office on Aug. 1, 2022.
Office Action for Chinese Patent Application No. 202210221468.8 issued by the Chinese Patent Office on Jun. 6, 2026.

* cited by examiner

*Primary Examiner* — Matthew T Martin
*Assistant Examiner* — Bartholomew A Hornsby
(74) *Attorney, Agent, or Firm* — IP&T GROUP LLP

(57) ABSTRACT

Provided is an apparatus for manufacturing a battery cell. The apparatus for manufacturing a battery cell includes a plurality of rollers pressing at least a portion of an exterior material of the battery cell in a first direction toward the battery cell, wherein the plurality of rollers are movable in the direction toward the battery cell and include a first roller and a second roller having inclined surfaces inclined at different angles.

9 Claims, 7 Drawing Sheets

APPARATUS FOR MANUFACTURING BATTERY CELL

CROSS-REFERENCE TO RELATED APPLICATION(S)

This application claims benefit of priority to Korean Patent Application No. 10-2021-0031421 filed on Mar. 10, 2021 and No. 10-2022-0025117 filed on Feb. 25, 2022 in the Korean Intellectual Property Office, the disclosures of which are incorporated herein by reference in their entirety.

BACKGROUND

1. Field

The present invention relates to an apparatus for manufacturing a battery cell.

2. Description of Related Art

Recently, a rechargeable secondary battery has been widely used as an energy source of a wireless mobile device. In addition, such a secondary battery has been prominent as a power source of an electric vehicle (EV), a hybrid electric vehicle (HEV), and the like, that have been suggested as a scheme for solving air pollution of existing gasoline vehicles, diesel vehicles, or the like, using fossil fuels.

Typically, during the manufacturing of a battery cell, the battery cell undergoes a folding operation of a joint portion (or sealing portion) of the casing of the battery cell. The folding includes folding the sealing portion of the casing toward a body portion of the battery cell. Since an area of the sealing portion of the battery cell is rather very narrow compared to a size of the entire battery cell, it is difficult to fold the sealing portion to the desired position, and the battery cell may be damaged during the folding, which may cause a problem in that the battery cell may become defective.

During the folding of the sealing portion of the battery cell, a sizing process of bringing a folding surface of the folded junction back into close contact with the body portion of the battery cell is performed. In this case, the sizing process is performed by a sizing roller that is a folding angle correction unit.

The related art has a problem of a springback phenomenon in which the sealing portion of the battery cell is folded toward the body portion by the sizing roller, and then the folded portion returns to an unfolded position again over time. For example, a left side of FIG. 1 illustrates a state immediately after the sealing portion is folded, and a right side of FIG. 1 illustrates a state that a predetermined time has elapsed after the sealing portion is folded. As illustrated in FIG. 1, there is a problem in that as time goes on from immediately after the sealing portion is folded so that an angle A1 between the sealing portion and the body portion of the battery cell becomes an acute angle, a folding angle A2 of the sealing portion gradually widens and changes to an obtuse angle.

The springback phenomenon mainly occurs at a boundary line between the sealing portion and the body portion of the battery cell, and may occur, for example, in a portion where the sealing portion is folded at 270°. That is, through the sizing process by the conventional sizing roller, there is a limitation in that the sealing portion does not maintain an acute angle with the body portion of the battery cell and the springback phenomenon occurs.

SUMMARY

An aspect of the present invention may increase efficiency and reliability of a manufacturing process of a battery cell. Specifically, the present invention allows a folding angle to be stably maintained after performing a process of folding a casing (or an exterior material) of a battery cell.

According to an aspect of the present invention, an apparatus for manufacturing a battery cell may include a plurality of rollers pressing at least a portion of an exterior material of the battery cell in a first direction toward the battery cell, wherein the plurality of rollers are movable in the direction toward the battery cell and include a first roller and a second roller having inclined surfaces inclined at different angles.

The first roller and the second roller are arranged side by side in a second direction, and the first direction is perpendicular to the second direction.

The apparatus may further include an elastic member connected to at least one of the first roller and the second roller to provide an elastic force in the direction perpendicular to the second direction.

The first roller and the second roller are each rotatable, and a rotation shaft of the first roller and a rotation shaft of the second roller are perpendicular to a reference plane.

The apparatus may further include: a third roller having a third inclined surface inclined at a different angle from a first inclined surface that is the inclined surface of the first roller and a second inclined surface that is the inclined surface of the second roller, in which the first roller, the second roller, and the third roller are sequentially arranged in the second direction.

angles between each of the first inclined surface, the second inclined surface, and the third inclined surface and a reference plane constantly decrease in the second direction.

According to another aspect of the present invention, an apparatus for manufacturing a battery cell for processing a sealing portion of an exterior material of the battery cell may include: at least one roller unit including an upper roller and a lower roller arranged to face each other, in which a rotation shaft of the upper roller and a rotation shaft of the lower roller are respectively perpendicular to a moving direction of the battery cell, and a roller gap which is a space through which at least a portion of the sealing portion of the exterior material passes formed between the upper roller, and the lower roller.

The roller gap is formed between a pressing surface of the upper roller and a pressing surface of the lower roller, and the pressing surface of the upper roller and the pressing surface of the lower roller press at least a portion of the sealing portion in opposite directions to each other.

The battery cell may include a body portion in which the electrode assembly is accommodated; and the sealing portion which is formed by sealing the exterior material at an edge of the body portion, and is bent toward the body portion, and the upper roller and the lower roller press a bent area of the sealing portion.

The rotation shaft of the upper roller is inclined with respect to an axis of rotation of the lower roller.

The upper roller is a hemispherical roller, the lower roller is a cylindrical roller, and a radius of the upper roller is greater than or equal to that of the lower roller.

At least one of the upper roller and the lower roller is movable in a direction narrowing the roller gap.

The plurality of roller units may be arranged in a moving direction of the battery cell.

A size of the roller gap of the plurality of roller units may gradually decrease in the transportation direction of the battery cell.

A size of the roller gap of at least some of the plurality of roller units may be greater than a thickness of the casing of the battery cell.

According to another aspect of the present invention, An apparatus for securing a sealing portion of a battery cell adjacent to a body portion of the battery cell may include: a plurality of pairs of press rollers arranged in a moving direction of the battery cell, in which each pair of the press rollers having a gap, and the first pair of the press rollers has a gap to receive the sealing portion of the battery cell and the gap of each subsequent pair of rollers is gradually reduced for applying a gradually increasing pressure on the sealing portion for urging the sealing portion closer to the body portion of the battery cell.

BRIEF DESCRIPTION OF DRAWINGS

The above and other aspects, features, and advantages of the present invention will be more clearly understood from the following detailed description taken in conjunction with the accompanying drawings, in which.

DETAILED DESCRIPTION

Figure 1:
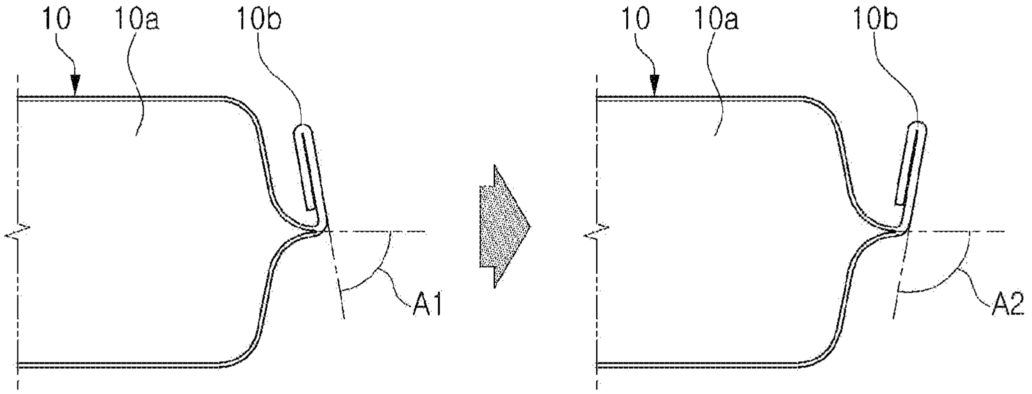
FIG. 1 is a simplified schematic of a springback phenomenon occurring after the conventional sizing process.

Hereinafter, embodiments of the present invention will be described with reference to the accompanying drawings. However, the described embodiments present invention may be modified in various other forms, and the scope of the present invention is not limited to the described embodiments. In addition, the embodiments described in the present invention are provided in order to better explain the present invention to those with ordinary knowledge in the art. In the drawings, shapes, sizes, and the like, of the various components may be exaggerated for clarity.

In addition, in the present specification, a singular expression may include a plural expression unless the context clearly dictates otherwise, and the same reference numerals may refer to the same or corresponding components throughout the specification.

In addition, in the present specification, terms "upper side," "upper portion," "lower side," "lower portion," "side surface," "front surface," "rear surface," and the like, are represented based on the drawings and may be differently represented when directions of corresponding targets are changed.

In addition, terms including an ordinal number, such as "first," "second," and the like used herein may be used to describe various components, but the components are not limited to the terms, and these terms are used only for the purpose of distinguishing one component from another. For example, a first component may be named a second component and the second component may also be similarly named the first component, without departing from the scope of the present invention to be described below.

Figure 2:
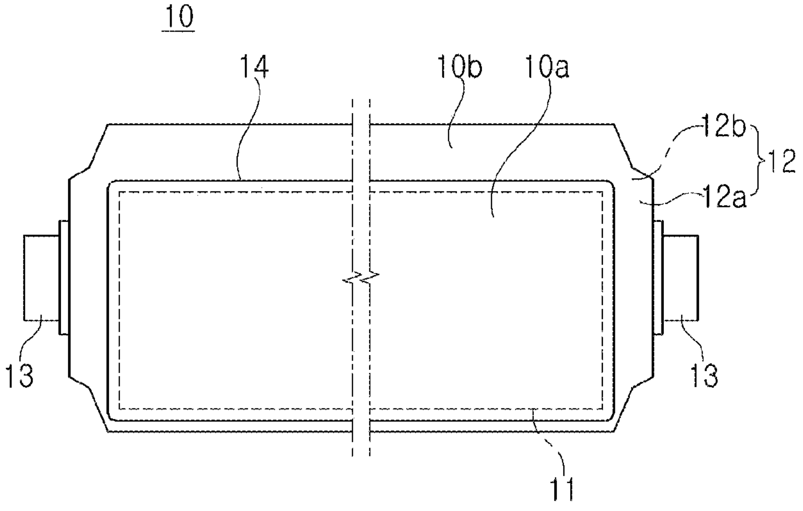
FIG. 2 is a diagram illustrating a pouch-type battery cell.
Figure 3:
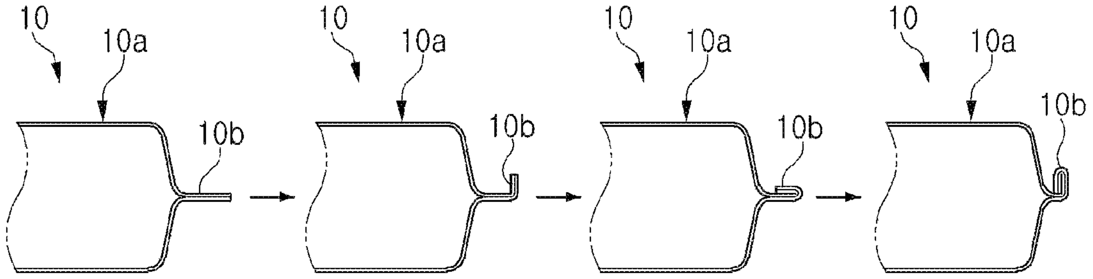
FIG. 3 is a diagram illustrating a process in which a sealing portion of a battery cell is folded according to embodiments of the present invention.

FIG. 2 illustrates a pouch-type battery cell 10. FIG. 3 illustrates a process in which a sealing portion of the battery cell 10 is folded according to embodiments of the present invention. Hereinafter, the process of folding the battery cell 10 will be described with reference to FIGS. 2 and 3.

Referring first to FIG. 2, the battery cell 10 includes an electrode assembly 11 and an exterior material 12 (or a pouch) surrounding the electrode assembly 11. The electrode assembly 11 is provided in a form in which a cathode plate and an anode plate are sequentially stacked, and may further include a separator between the cathode plate and the anode plate.

The exterior material 12 is provided in a form of enclosing the electrode assembly 11 to configure an appearance of the battery cell 10, and may protect the electrode assembly 11 from external impact. In addition, the exterior material 12 may seal the electrode assembly 11 from the outside. The battery cell 10 includes an electrode tab 13 extending in a longitudinal direction, and the electrode tab 13 is connected to an electrode plate (cathode plate or anode plate) of the electrode assembly 11.

The exterior material 12 may be provided in the form in which the electrode assembly 11 is sandwiched from both sides. For example, the exterior material 12 may include a first exterior material 12*a* surrounding an upper portion of the electrode assembly 11 and a second exterior material 12*b* surrounding a lower portion of the electrode assembly 11. An inner portion of the exterior material 12 surrounds the electrode assembly 11, and a peripheral portion thereof may be joined to a peripheral portion of the opposite exterior material 12. For example, a first exterior material 12*a* and a second exterior material 12*b* are joined to each other at an edge portion. In this case, the first exterior material 12*a* and the second exterior material 12*b* may be provided as a single exterior material 12. That is, the single exterior material 12 surrounds the upper and lower portions of the electrode assembly 11, and is joined near the other side portion (for example, both side portions in a longitudinal direction of the battery cell 10 of FIG. 2) except for one side (for example, an upper side portion of the battery cell 10 of FIG. 2) of the electrode assembly 11 to seal the electrode assembly 11 from the outside.

In embodiments, the battery cell 10 may include a body portion 10*a* and a sealing portion 10*b*. The body portion 10*a* refers to a portion having a thickness corresponding to the electrode assembly 11. The cross-section of the body portion 10*a* may include the electrode assembly 11 and the exterior material 12 covering both sides of the electrode assembly 11. The sealing portion 10*b* means a thin portion extending in the longitudinal direction (or a direction perpendicular to a stacking direction) or a width direction from the body portion 10*a*. The sealing portion 10*b* may be formed by joining the exterior material 12 to each other at the edge of the body portion 10*a*, or the sealing portion 10*b* may be formed by sealing the exterior material 12 at the edge of the body portion 10*a*. For example, the cross-section of the sealing portion 10*b* may be formed of a two-ply exterior materials (e.g., the first exterior material 12*a* and the second exterior material 12*b*) joined to each other. The sealing portion 10*b* may be folded one or more times toward the body portion 10*a* through the folding process of the various embodiments of the present invention.

Referring to FIG. 3, the sealing portion 10*b* of the battery cell 10 may be gradually folded through a plurality of folding processes. In this case, each of the folding processes may be performed by one folding process unit or may be sequentially performed by individual folding process units.

As illustrated in FIG. 3, the sealing portion 10*b* of the battery cell 10 is folded one or more times through a plurality of folding processes. For example, the sealing portion 10*b* may be folded by about 90° in a first folding process and folded again by 90° in a second folding process to a folded state of 180°. In addition, the sealing portion 10*b* may be additionally folded by 90° in a third folding process to a new folded state which is referred to as a folded state of 270°. In this manner, ultimately, the sealing portion 10*b* may be positioned adjacent to a sidewall (14 in FIG. 2) of the body portion 10*a*.

On the other hand, the sealing portion 10*b* illustrated in FIG. 3 refers to a portion in which the electrode tab 13 is not positioned among other portions remaining after surrounding the electrode assembly 11 in the exterior material 12 of the battery cell 10 of FIG. 2. That is, the sealing portion 10*b* illustrated in FIG. 3 may correspond to the upper side portion of the battery cell 10 among the other portions remaining after surrounding the electrode assembly 11 in the exterior material 12 of the battery cell 10 of FIG. 2. However, FIG. 2 only shows an example of a battery cell 10 which has a sealing portion 10*b* formed on only three side surfaces thereof. In another example, when the sealing portion 10*b* is formed on four surfaces of the battery cell 10, for example, by overlapping two exterior materials 12, a process of folding the upper side portion and the lower side portion where the electrode tab 13 is not positioned may be performed several times. As an example, the sealing portion 10*b* described in the following FIGS. 4 to 7 corresponds to the sealing portion 10*b* of FIG. 3, and overlapping descriptions thereof will be omitted.

In addition, although the folding process is illustrated in FIG. 3 as going through four operations or steps, this is only an example, and the folding process may include two, three, or five or more folding operations.

Referring to the flowchart of FIG. 4, the folding process according to embodiments of the present invention will be described in more detail. The battery cell and its constituent parts described in FIG. 4 may correspond to the battery cell and its constituent parts described in FIGS. 2 and 3, and overlapping descriptions thereof will be omitted.

Prior to folding the sealing portion (e.g., 10*b* of FIG. 2) of the battery cell (e.g., 10 in FIG. 2), the position of the battery cell is aligned in an aligning step (S301). That is, in the aligning step (S301), in order to accurately fold the sealing portion at a desired position, the battery cell is arranged in place.

After arranging the battery cell in place, a cutting step (S302) of cutting the sealing portion of the battery cell to a predetermined length is performed so that the sealing portion may be folded by a specified length. The cutting step (S302) may also be referred to herein as the final cutting step.

Before the folding process proceeds, a pre-forming location (PFL) step (S303) is performed. The pre-forming location step (S303) may pre-form (or pre-molds) the corresponding folding line to prevent meandering during the folding of the sealing portion 10*b*.

The sealing portion of the battery cell that has undergone the PFL step (S303) is folded at least once in the first folding step (S304) so that an end of the sealing portion is directed toward the sidewall of the body portion of the battery cell. That is, in the first folding step (S304), the sealing portion is folded by 180° (refer to the third schematic of FIG. 3).

In a first press step (S305), the sealing portion folded by 180° is molded by being pressed under heat and pressure. The heat and pressure are applied to the folded portion in order to maintain the folded shape.

The folded sealing portion is again folded at least once in a second folding step (S306) so that the sealing portion is directed in the width direction of the battery cell. That is, in the second folding step (S306), the sealing portion is folded by 90° in the same direction as the folding direction in the first folding step (refer to the fourth schematic of FIG. 3). The second folding step may also be referred to as the 270° folding step (S306).

Thereafter, in the second press step (S307), the folded sealing portion while it is in the 270° folded configuration is further molded by being pressed under heat and pressure. The heat and pressure are applied to the folded portion to maintain the folded shape. The second press step (S307) may also be referred to as the 270° press step (S307).

In a sizing step (S308), by passing the folded sealing portion through a sizing roller or a pressure roller, the sealing portion is molded to be adjacent to the sidewall of the body portion of the battery cell. Accordingly, the folded sealing portion is adjacent to the sidewall of the body portion of the battery cell while forming an acute angle with the sidewall of the body portion of the battery cell.

Figure 4:
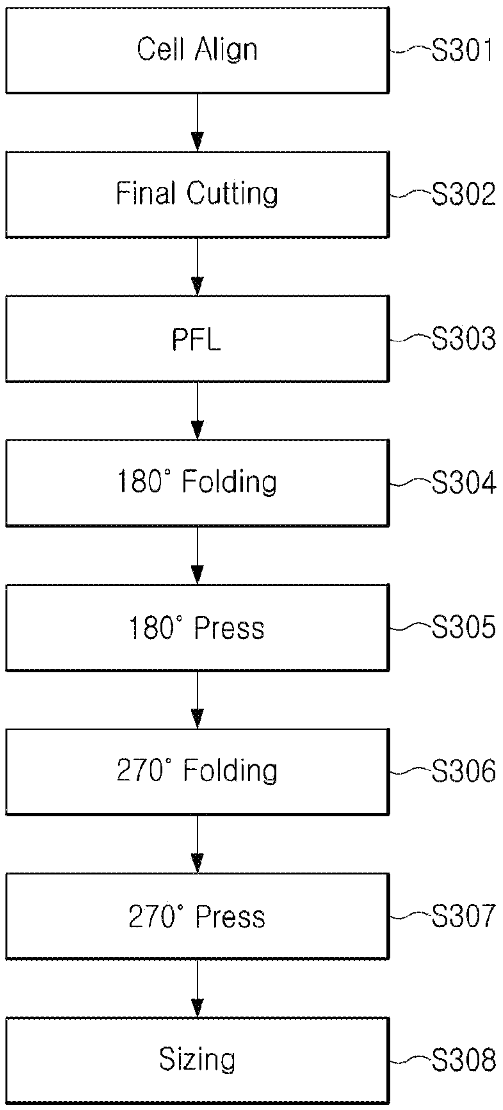
FIG. 4 is a flowchart of a folding process according to embodiments of the present invention.

However, in the folding process of the embodiments of the present invention, at least some of the various processes described in FIG. 4 may be omitted or additionally added. In addition, the order of various processes described in FIG. 4 is not limited to the illustrated ones, and any two or more processes may be performed simultaneously or several processes may be performed in different, e.g., reverse, order.

Figure 5:
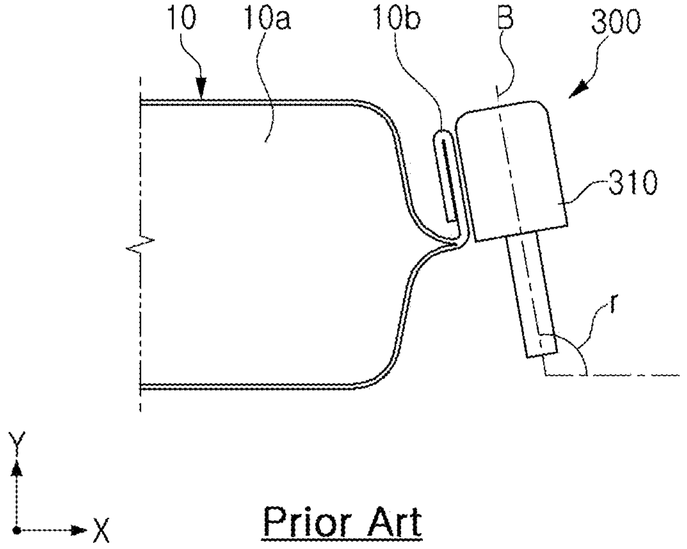
Prior Art FIG. 5
FIG. 5 is a simplified schematic of the conventional folding apparatus.

Hereinafter, the apparatus for manufacturing a battery cell that performs at least a part of the folding process described with reference to FIG. 4 will be described in detail with reference to FIGS. 5 to 7.

First, a folding apparatus 300 for performing a sizing step (e.g., S308 in FIG. 4) will be described with reference to FIG. 5.

The folding apparatus 300 is a conventional apparatus according to the related art. FIG. 5 is a simplified schematic of the conventional folding apparatus. The folding apparatus 300 according to the related art includes an acute angle forming roller 310 that presses the sealing portion 10*b* of the battery cell 10 in one direction to bring the sealing portion 10*b* into close contact with the body portion 10*a* of the battery cell 10 as much as possible.

The acute angle forming roller 310 according to the related art is constrained to a predetermined position. For example, as illustrated in FIG. 5, the acute angle forming roller 310 is provided to have a fixed position so as not to move in X-axis and Y-axis directions. In addition, the acute angle forming roller 310 may be provided to be inclined at a predetermined angle so that the sealing portion 10*b* may be in close contact with the body portion 10*a* of the battery cell 10. For example, as illustrated in FIG. 5, an angle "r" between the rotation shaft B of the acute angle forming roller 310 and a reference plane (e.g., a plane parallel to the X axis of FIG. 5) is formed to have an obtuse angle. Here, the reference plane may be, for example, a support surface on which the battery cell 10 is supported. That is, when the angle between the rotation shaft B of the acute angle forming roller 310 and the reference plane (e.g., the support surface on which the battery cell 10 is supported) is defined as an installation angle r, r may be greater than 90°.

However, in the case of the related art, since the acute angle forming roller 310 is fixed at a specific position, when the position of the battery cell 10 is not constantly maintained (e.g., when the position in the X-axis direction of the battery cell is not accurate or a tolerance in the size of the battery cell during the manufacturing process occurs), there may be a problem in that a portion or an angle where the acute angle forming roller 310 and the sealing portion 10*b* of the battery cell 10 may contact each other may not be constant. That is, when the acute angle forming roller 310 is provided at a fixed position, it is difficult to quickly respond to a change in position of the battery cell 10, so it may be difficult to accurately fold the sealing portion 10*b*.

In order to prevent the above problems of the related art, a folding apparatus 400 according to the various embodiments of the present invention may include a roller having an improved structure compared to the conventional acute angle forming roller 310. For example, the roller with the improved structure may include a sizing roller 410 described in FIGS. 6 and 7.

Figure 6:
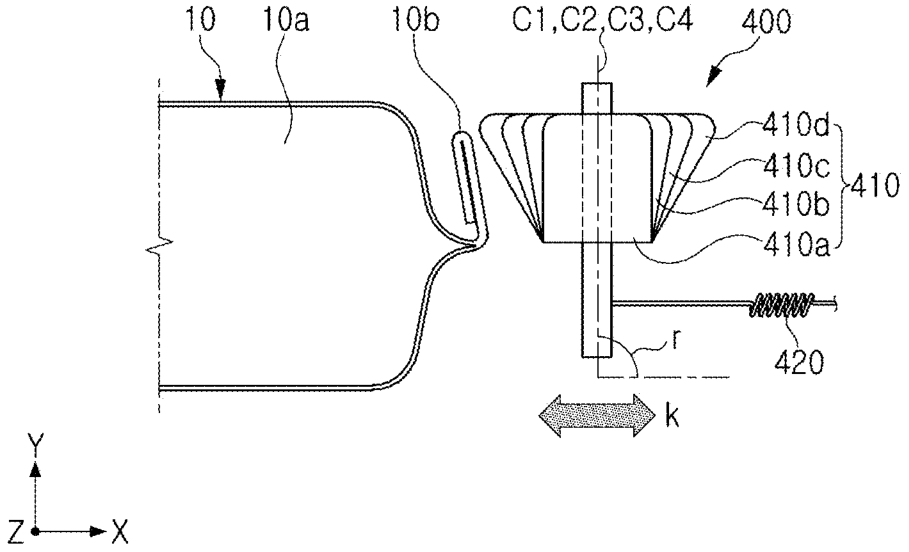
FIG. 6 is a simplified schematic of a folding apparatus according to embodiments of the present invention.
Figure 7:
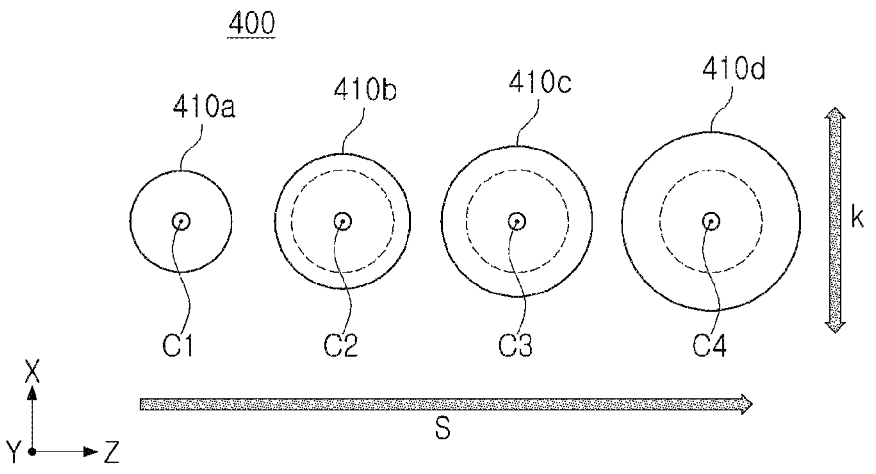
FIG. 7 is a diagram illustrating the folding apparatus according to embodiments of the present invention as viewed from different angles.

FIG. 6 is a simplified schematic of the folding apparatus according to the embodiments of the present invention, and FIG. 7 illustrates the folding apparatus according to the embodiments as viewed from different angles.

As illustrated in FIG. 6, the folding apparatus 400 according to the embodiments of the present invention may include a plurality of sizing rollers 410*a*, 410*b*, 410*c*, and 410*d*. The plurality of sizing rollers 410*a*, 410*b*, 410*c*, and 410*d* may be arranged side by side in one direction, e.g., the Z-axis direction in FIG. 6. When the battery cell 10 is provided to be movable, the direction in which the plurality of sizing rollers 410*a*, 410*b*, 410*c*, and 410*d* are arranged may be parallel to the moving direction (e.g., arrow S direction in FIG. 7) of the battery cell 10.

In embodiments, the plurality of sizing rollers 410*a*, 410*b*, 410*c*, and 410*d* may respectively have a roller surface (or inclined surface) that may contact the sealing portion 10*b*. In this case, each inclined surface may be configured to be inclined at a predetermined angle with respect to the reference plane. Here, the reference plane may be a virtual surface on which a relative position is fixed with respect to the sizing rollers 410*a*, 410*b*, 410*c*, and 410*d*. For example, the reference plane may be a support surface on which the battery cell 10 is supported or a ground on which the sizing roller 410 is installed.

In embodiments, each inclined surface of the plurality of sizing rollers 410*a*, 410*b*, 410*c*, and 410*d* may be configured to be inclined at different angles with respect to the reference plane. For example, the angle between the inclined surface of the second sizing roller 410*b* and the ground may be different from the angle between the inclined surface of the third sizing roller 410*c* and the ground.

In embodiments, the angle between each inclined surface of the plurality of sizing rollers 410*a*, 410*b*, 410*c*, and 410*d* and the reference plane may gradually decrease along the direction in which the plurality of sizing rollers 410*a*, 410*b*, 410*c*, and 410*d* are arranged. For example, as illustrated in FIG. 6, the inclined surface of the third sizing roller 410*c* may be arranged to be more inclined toward the battery cell 10 than the inclined surface of the second sizing roller 410*b*, and the inclined surface of the fourth sizing roller 410*d* may be arranged to be more inclined toward the battery cell 10 than the inclined surfaces of the third sizing roller 410*c* and the second sizing roller 410*b*. In this case, the rate at which the angle decreases may be constant, but is not limited thereto.

In embodiments, each of the plurality of sizing rollers 410*a*, 410*b*, 410*c*, and 410*d* may be provided in different shapes. For example, as illustrated in FIG. 6, the first sizing roller 410*a* may be provided in a cylindrical shape, the second sizing roller 410*b* adjacent to the first sizing roller 410*a* may be provided in a truncated cone shape with a wide upper surface, the third sizing roller 410*c* adjacent to the second sizing roller 410*b* may be provided in a truncated cone shape with a wider upper surface than that of the second sizing roller 410*b*, and the fourth sizing roller 410*d* adjacent to the third sizing roller 410*c* may be provided in a truncated cone shape with a wider upper surface than that of the third sizing roller 410*c*. When viewed from another angle, as illustrated in FIG. 7, the plurality of sizing rollers 410*a*, 410*b*, 410*c*, and 410*d* may be arranged to have a gradually wider upper surface in one direction (e.g., the Z-axis direction in FIG. 7).

In embodiments, each of the sizing rollers 410*a*, 410*b*, 410*c*, and 410*d* may be configured to be rotatable. In this case, rotation shafts C1 to C4 of each of the sizing rollers 410*a*, 410*b*, 410*c*, and 410*d* may be parallel to each other.

In embodiments, the installation angle r of the sizing rollers 410*a*, 410*b*, 410*c*, and 410*d* may be approximately perpendicular to a reference plane (e.g., the ground). Even if the installation angles r of the sizing rollers 410*a*, 410*b*, 410*c*, and 410*d* are 90°, since the shapes of the sizing rollers 410*a*, 410*b*, 410*c*, and 410*d* are variously provided, the alignment position of the battery cell 10 is changed, and thus, it is possible to press the sealing portion 10*b* to be in close contact with the body portion 10*a* of the battery cell 10 as much as possible even if the position of the sealing portion 10*b* is changed. Since the second to fourth sizing rollers 410*b*, 410*c*, and 410*d* are provided in a truncated cone shape with a wider upper surface than a lower surface, it is possible to press the sealing portion 10*b* to be in close contact with the body portion 10*a* of the battery cell 10 as much as possible.

In addition, since the plurality of sizing rollers 410*a*, 410*b*, 410*c*, and 410*d* according to the embodiments may be provided in various sizes and shapes, respectively, even if the position of the battery cell 10 is changed, the sealing portion 10*b* may be brought into close contact with the body portion 10*a* of the battery cell 10 as much as possible.

In embodiments, the sizing rollers are all provided as cylindrical rollers, in which the rotation shafts of each of the sizing rollers may be different. For example, the first to fourth sizing rollers arranged in one direction (e.g., the moving direction of the battery cell) may be arranged to be gradually inclined toward the battery cell 10. According to this arrangement structure, in pressing the sealing portion 10*b* of the battery cell 10, it is possible to obtain similar effects to the sizing rollers 410*a*, 410*b*, 410*c*, and 410*d* having different inclined surfaces.

In embodiments, the plurality of sizing rollers 410*a*, 410*b*, 410*c*, and 410*d* is configured to enable a reciprocating sliding drive in one direction (e.g., arrow k direction in FIGS. 6 and 7) through a linear guide (not illustrated). Here, one direction may be a direction parallel to the support surface on which the battery cell 10 is supported. That is, at least some of the plurality of sizing rollers 410*a*, 410*b*, 410*c*, and 410*d* may slide in a direction toward the battery cell 10 or in a direction away from the battery cell 10.

In embodiments, the plurality of sizing rollers 410*a*, 410*b*, 410*c*, and 410*d* may slide so that the rotation shafts C1 to C4 of the sizing rollers 410*a*, 410*b*, 410*c*, and 410*d* move in parallel in one direction (e.g., arrow k direction in FIG. 7).

In embodiments, a linear guide is connected to at least some of the plurality of sizing rollers 410*a*, 410*b*, 410*c*, and 410*d*, and may include a guide rail extending in a direction (e.g., the X-axis direction in FIG. 6) toward the battery cell 10. However, the configuration of the linear guide is not limited thereto, and the linear guide may have any configuration as long as it may guide the linear motion of at least some of the plurality of sizing rollers 410*a*, 410*b*, 410*c*, and 410*d*.

In embodiments, the linear guide may further include an elastic member 420 that is directly or indirectly connected to at least some of the sizing rollers 410*a*, 410*b*, 410*c*, and 410*d* to press the sizing rollers 410*a*, 410*b*, 410*c*, and 410*d* in the direction toward the battery cell 10. Accordingly, at least some of the plurality of sizing rollers 410*a*, 410*b*, 410*c*, and 410*d* are connected to the elastic member 420, and thus may be elastically supported in a direction (e.g., arrow k direction in FIG. 6) toward the battery cell 10 on the linear guide by an elastic force of the elastic member 420.

The direction of the elastic force of the elastic member 420 may be perpendicular to the direction in which the sizing rollers 410*a*, 410*b*, 410*c*, and 410*d* are arranged.

The plurality of sizing rollers 410*a*, 410*b*, 410*c*, and 410*d* according to the embodiments may press the sealing portion 10*b* above a predetermined pressure by the elastic force of the elastic member 420 to compensate for the position tolerance of the battery cell 10 even if the position of the battery cell 10 is changed due to the misalignment or tolerance of the battery cell.

Hereinafter, a folding apparatus 500 according to another embodiment for performing a sizing step (e.g., S308 in FIG. 4) will be described with reference to FIGS. 8 and 9.

Figure 8:
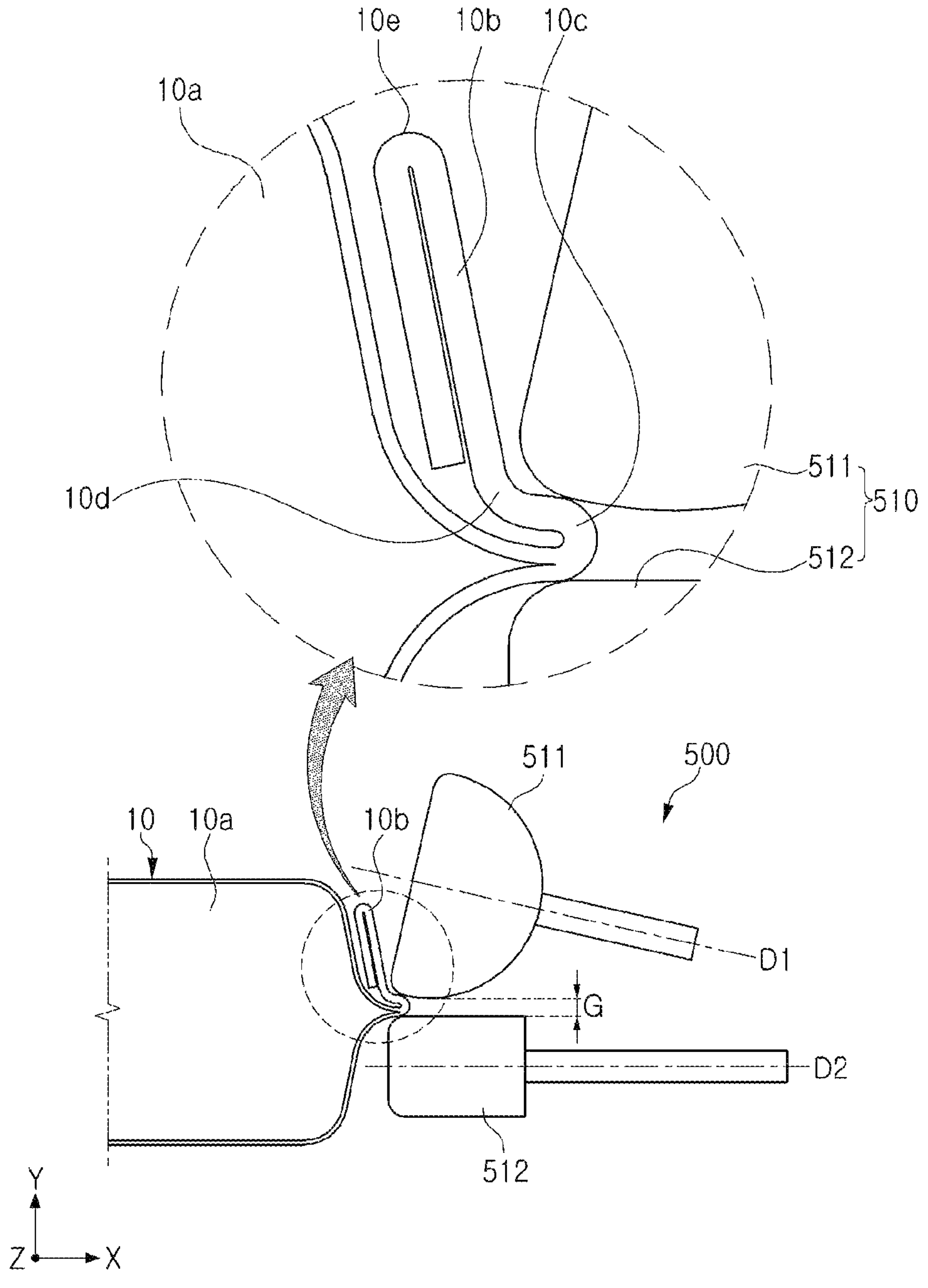
FIG. 8 is a simplified schematic of the folding apparatus according to embodiments of the present invention.

FIG. 8 is a simplified schematic of the folding apparatus 500 according to embodiments.

The folding apparatus 500 according to the embodiments may process the edge of the folded battery cell 10 through a second folding step (e.g., S306 in FIG. 4) to mold the sealing portion 10*b* of the battery cell 10 so that the sealing portion 10*b* of the battery cell 10 is in close contact along the body portion 10*a*.

The folding apparatus 500 may include one or more pressure roller units 510. The pressure roller unit 510 may include a pair of pressure rollers 511 and 512 for processing the edge of the battery cell 10. For example, as illustrated in FIG. 8, the pressure roller unit 510 of the folding apparatus 500 includes an upper pressure roller 511 and a lower pressure roller 512 arranged side by side in the vertical direction (e.g., the Y-axis direction).

The upper pressure roller 511 and the lower pressure roller 512 according to embodiments may have different shapes or different sizes. For example, as illustrated in FIG. 8, the upper pressure roller 511 may be provided as a hemispherical roller, and the lower pressure roller 512 may be provided as a cylindrical roller. In this case, a radius of the hemispherical roller of the upper pressure roller 511 may be greater than or equal to a radius of an end surface of the cylindrical roller of the lower pressure roller 512. However, the shapes of the upper pressure roller 511 and the lower pressure roller 512 are not limited thereto, and for example, the upper pressure roller 511 may be provided in the shape of a truncated cone and the lower pressure roller 512 may be provided in a conical shape. In addition, the upper pressure roller 511 and the lower pressure roller 512 may be provided in the same shape.

The upper pressure roller 511 and the lower pressure roller 512 may be provided side by side in the vertical direction, and may have a predetermined space between opposing roller surfaces (or pressure surfaces). Here, the vertical direction may be a thickness direction of the battery cell 10. The predetermined space is defined as a roller gap G. The edge of the battery cell 10, for example, the sealing portion 10*b* may pass through the roller gap G. While the sealing portion 10*b* passes through the roller gap G, the two pressing surfaces of the pressure roller unit 510 press the sealing portion 10*b* to form one or more bent portions 10*c* and 10*d* in the sealing portion 10*b*.

In embodiments, the roller gap G may be smaller than the thickness of the battery cell. In addition, the roller gap G may be smaller than the thickness of the bent portion 10*c* in the sealing portion 10*b* bent at least once or more. That is, the roller gap G may be smaller than the thickness of the state in which the sealing portion 10*b* is vertically overlapped. Accordingly, the sealing portion 10*b* is pressed by the upper pressure roller 511 and the lower pressure roller 512 while passing through the roller gap G, so the bent portion may be folded more reliably.

The upper pressure roller 511 and the lower pressure roller 512 may press the sealing portion so that the sealing portion 10*b* of the battery cell is in closer contact with the body portion 10*a*. For example, one or more bent portions 10*c* and 10*d* may be formed in the sealing portion 10*b* by pressing a boundary between the body portion 10*a* and the sealing portion 10*b* of the battery cell 10. Accordingly, the sealing portion 10*b* may be in closer contact with the body portion 10*a*.

In embodiments, the upper pressure roller 511 and the lower pressure roller 512 may each be configured to be rotatable. Accordingly, a frictional force may be reduced while the edge of the battery cell 10 passes between the upper pressure roller 511 and the lower pressure roller 512. As illustrated in FIG. 8, a rotation shaft D1 of the upper pressure roller 511 and a rotation shaft D2 of the lower pressure roller 512 may be configured to be inclined to each other. However, what is illustrated in the drawings is only an exemplary configuration, and the rotation shafts D1 and D2 of the upper pressure roller 511 and the lower pressure roller 512 may be parallel to each other.

Referring to FIG. 8, the pressure roller unit 510 may press the sealing portion 10*b* in different directions. For example, the upper pressure roller 511 may press the sealing portion 10*b* with a pressing force having a direction toward the lower pressure roller 512, and the lower pressure roller 512 may press the sealing portion 10*b* with a pressing force having a direction toward the upper pressure roller 511.

The sealing portion 10*b* of the battery cell 10 may have one or more bent portions 10*c* and 10*d* by being pressed in different directions by the pressure roller unit 510 according to the embodiments. For example, as illustrated in FIG. 8, the upper pressure roller 511 and the lower pressure roller 512 may press the sealing portion 10*b* in different directions to form the first bent portion 10*c* of the sealing portion 10*b* in a space between the pressure rollers 511 and 512. In addition, the second bent portion 10*d* of the sealing portion 10*b* may be formed in the space between the edge of the upper pressure roller 511 and the body portion 10*a* of the battery cell 10 by being pressed against the edge of the upper pressure roller 511.

In embodiments, the first bent portion 10*c* of the sealing portion 10*b* may be formed in a "U" shape. Accordingly, the edge of the sealing portion 10*b* may be folded toward the body portion 10*a* of the battery cell 10.

In embodiments, the second bent portion 10*d* of the sealing portion 10*b* may be formed to have an obtuse angle. Since the second bent portion 10*d* is formed to have an obtuse angle, an end of the sealing portion 10*b* may be folded in close contact with a curve of the boundary portion between the body portion 10*a* and the sealing portion 10*b* of the battery cell 10 as much as possible.

The plurality of bent portions 10*c* and 10*d* may be formed in different portions of the sealing portion 10*b* by the pressure roller unit 510 of the folding apparatus 500 according to the embodiments, so the sealing portion 10*b* may be in close contact with the body portion 10*a* of the battery cell 10 as much as possible. In addition, since the plurality of bent portions 10*c* and 10*d* are formed in the sealing portion 10*b* of the battery cell 10 by the folding apparatus 500 according to the embodiments, even if the bent portions 10*c* and 10*d* are stretched due to the elastic force or tension by the material of the sealing portion 10*b* over time, the end portion (for example, 10*e* in FIG. 8) of the sealing portion 10*b* may not deviate from a position corresponding to an outermost portion of the battery cell 10 immediately after the folding process.

That is, the plurality of bent portions 10*c* and 10*d* are formed in the sealing portion 10*b* of the battery cell 10 by the pressure roller unit 510 of the folding apparatus 500, so it is possible to suppress the springback phenomenon that may occur over time after the sizing step (S308 in FIG. 4) and prevent the end portion (for example, 10*e* in FIG. 8) of the sealing portion 10*b* from deviating from the position corresponding to the outermost boundary of the battery cell 10.

In embodiments, the folding apparatus 500 may include a plurality of pressure roller units. Hereinafter, the folding apparatus 500 including the plurality of pressure roller units will be described with reference to FIG. 9.

Figure 9:
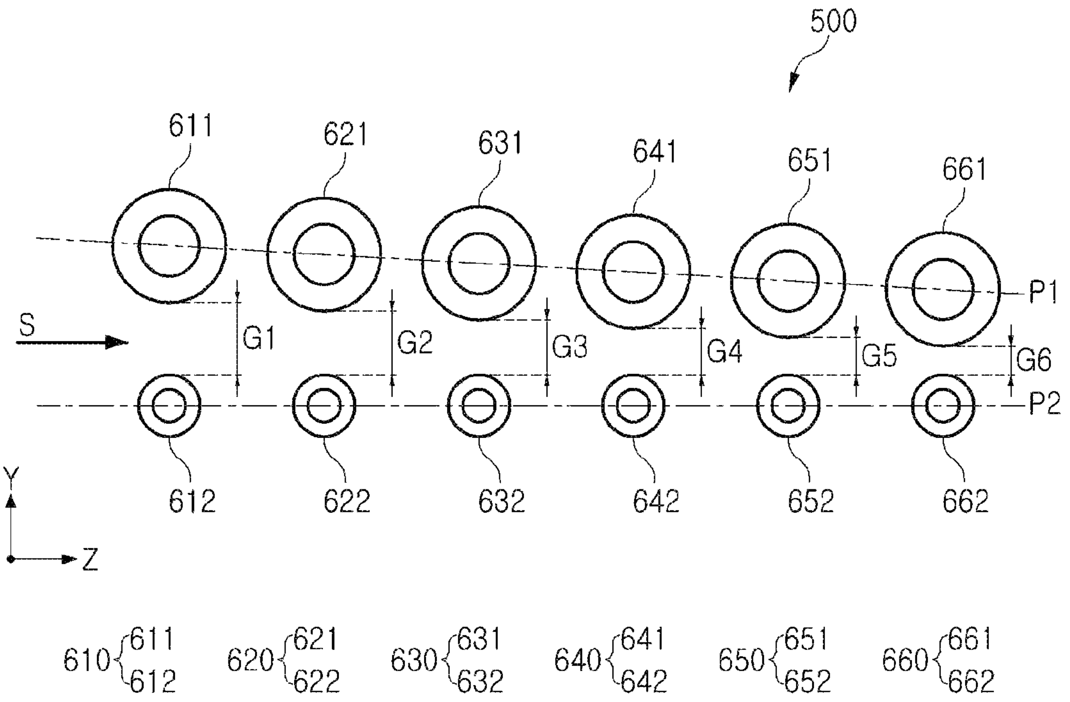
FIG. 9 is a diagram illustrating the folding apparatus according to embodiments of the present invention as viewed from different angles.

FIG. 9 is a diagram illustrating the folding apparatus according to embodiments viewed from different angles. Specifically, FIG. 9 schematically illustrates the appearance of the folding apparatus viewed in a direction approximately parallel to the rotation shaft of the pressure roller included in the pressure roller unit, and illustrates an arrangement of a plurality of pressure roller units 610, 620, 630, 640, 650, and 660.

The folding apparatus 500 according to embodiments may include the plurality of pressure roller units 610, 620, 630, 640, 650, and 660. For example, as illustrated in FIG. 9, the folding apparatus 500 may include the plurality of pressure roller units 610, 620, 630, 640, 650, and 660 arranged side by side in the moving direction (arrow S direction in FIG. 9) of the battery cell (10 in FIG. 8). The folding apparatus 500 and the pressure roller units 610, 620, 630, 640, 650, and 660 to be described below include all the features of the folding apparatus 500 and the pressure roller unit 510 described in FIG. 8, and therefore, the overlapping description thereof will be omitted.

In embodiments, each gap (that is, roller gap) between upper pressure rollers 611, 621, 631, 641, 651, and 661 and lower pressure rollers 612, 622, 632, 642, 652, and 662 may be differently provided by the plurality of pressure roller units 610, 620, 630, 640, 650, and 660. For example, a first roller gap G1 of the first pressure roller unit 610 and a second roller gap G2 of the second pressure roller unit 620 may be different from each other.

The plurality of pressure roller units 610, 620, 630, 640, 650, and 660 included in the folding apparatus 500 according to the embodiments may be arranged side by side from an inlet side to an outlet side of the folding apparatus 500. In this case, the roller gaps G1 to G6 of each of the plurality of pressure roller units 610, 620, 630, 640, 650, and 660 may be provided to gradually decrease in a direction (for example, a Z-axis direction) from the inlet side to the outlet side of the folding apparatus 500. For example, as illustrated in FIG. 9, the first to sixth pressure roller units 610, 620, 630, 640, 650, and 660 may be provided side by side in the direction (Z-axis direction) from the inlet side to the outlet side of the folding apparatus 500, and the roller gaps G1 to G6 may be provided to gradually decrease from the first roller gap G1 to the sixth roller gap G6.

In embodiments, the roller gaps G1 to G6 of the folding apparatus 500 may be provided to decrease at a constant rate in the moving direction (arrow S direction in FIG. 9) of the battery cell (10 in FIG. 8). Accordingly, an imaginary line P1 connecting rotation centers of the upper pressure rollers 611, 621, 631, 641, 651, and 661 and an imaginary line P2 connecting rotation centers of the lower pressure rollers 612, 622, 632, 642, 652, and 662 may have a predetermined angle. That is, the pressure roller units 610, 620, 630, 640, 650, and 660 of the folding apparatus 500 may be arranged so that the roller gaps G1 to G6 have a tapered shape gradually narrowing. In this case, the angle between the tapered shapes may have an angle of approximately 3°. However, the angle between the tapered shapes may be variously configured as needed.

Since the roller gaps G1 to G6 gradually decrease in the moving direction (arrow S direction in FIG. 9) of the battery cell (10 in FIG. 8), the sealing portion (10*b* in FIG. 8) of the battery cell (10 in FIG. 8) passing through the roller gaps G1 to G6 may be gradually strongly pressed, and thus, pressed with the greatest pressure in the roller gap G6 of the pressure roller unit (e.g., 660 in FIG. 9) on the outlet side of the folding apparatus 500.

In embodiments, the first pressure roller unit 610 on the inlet side of the folding apparatus 500 may not press the sealing portion (10*b* in FIG. 8) of the battery cell (10 in FIG. 8). That is, the roller gap G1 of the first pressure roller unit 610 provided on the inlet side is greater than the thickness of the edge of the battery cell (10 in FIG. 8), that is, the portion where the sealing portion (10*b* in FIG. 8) is folded, and thus, may serve to guide the sealing portion (10*b* of FIG. 8) of the battery cell (10 in FIG. 8) to enter the roller gap G2 of the adjacent second pressure roller unit 620 without the sealing portion (10*b* in FIG. 8) being pressed. As the battery cell (10 in FIG. 8) continues to move in one direction (arrow S direction in FIG. 9), the roller gap of at least some of the plurality of pressure roller units 610, 620, 630, 640, 650, and 660 becomes smaller than the thickness of the folded portion of the sealing portion (10*b* in FIG. 8), and the sealing portion (10*b* in FIG. 8) of the battery cell (10 in FIG. 8) is pressed to be firmly folded with a gradually strong pressure as the battery cell (10 of FIG. 8) is moved. Finally, the pressure roller unit (e.g., the sixth pressure roller unit 610 in FIG. 9) on the outlet side of the folding apparatus 500 may accurately fold the sealing portion (10*b* in FIG. 8) of the battery cell (10 in FIG. 8) so that the sealing portion 10*b* may be folded to have a desired folding shape.

The plurality of pressure roller units 610, 620, 630, 640, 650, and 660 according to embodiments may serve to guide the movement of the battery cell (10 in FIG. 8) toward the next pressure roller unit while pressing the sealing portion (10*b* in FIG. 8) of the battery cell (10 in FIG. 8). That is, since the pressure sequentially increases in the moving direction (arrow S direction in FIG. 9) of the battery cell (10 in FIG. 8), the folding apparatus 500 may press the sealing portion (10*b* in FIG. 8) at the correct position. Finally, by pressing with the strongest pressure in the roller gap (e.g., G6 in FIG. 9) provided on the outlet side of the folding apparatus 500, one or more bent portions (e.g., 10*c* and 10*d* in FIG. 8) may be formed in the sealing portion (10*b* in FIG. 8).

As set forth above, according to an apparatus for manufacturing a battery cell according to embodiments, it is possible to fold a sealing portion of a battery cell at a desired angle.

According to an apparatus for manufacturing a battery cell according to embodiments, it is possible to stably maintain a folding angle of a battery cell.

According to an apparatus for manufacturing a battery cell according to embodiments, it is possible to prevent a sealing portion from being unsealed by effectively folding some surfaces of the sealing portion of the battery cell. In addition, it is possible to increase a volume of an electrode assembly arranged in an inner space of a module housing having the same size as some surfaces of the sealing portion of the battery cell are folded.

Hereinabove, the composition and characteristics of the present invention have been described based on embodiments according to the present invention, but the present invention is not limited thereto, and it is apparent to those skilled in the art that the present invention can be variously changed or modified within the spirit and scope of the present invention. Therefore, it is noted that such changes or modifications fall within the scope of the appended claims.

What is claimed is:

1. An apparatus for manufacturing a battery cell for processing a sealing portion of an exterior material of the battery cell, the apparatus comprising:

at least one roller unit including an upper roller and a lower roller arranged to face each other, wherein a rotation shaft of the upper roller and a rotation shaft of the lower roller are respectively perpendicular to a moving direction of the battery cell, and a roller gap which is a space through which at least a portion of the sealing portion of the exterior material passes formed between the upper roller and the lower roller, wherein an axis of rotation of the upper roller is inclined with respect to an axis of rotation of the lower roller.

2. The apparatus of claim 1, wherein the roller gap is formed between a pressing surface of the upper roller and a pressing surface of the lower roller, and the pressing surface of the upper roller and the pressing surface of the lower roller press at least a portion of the sealing portion in opposite directions to each other.

3. The apparatus of claim 1, wherein the battery cell includes:

a body portion in which the electrode assembly is accommodated; and the sealing portion which is formed by sealing the exterior material at an edge of the body portion, and is bent toward the body portion, wherein the upper roller and the lower roller press a bent area of the sealing portion.

4. The apparatus of claim 1, wherein the upper roller is a hemispherical roller, the lower roller is a cylindrical roller, and a radius of the upper roller is greater than or equal to that of the lower roller.

5. The apparatus of claim 1, wherein at least one of the upper roller and the lower roller is movable in a direction narrowing the roller gap.

6. The apparatus of claim 1, wherein the plurality of roller units are arranged in a moving direction of the battery cell.

7. The apparatus of claim 6, wherein a size of the roller gap of the plurality of roller units gradually decreases in the moving direction of the battery cell.

8. The apparatus of claim 6, wherein a size of the roller gap of at least some of the plurality of roller units is greater than a thickness of the exterior material of the battery cell.

9. An apparatus for securing a sealing portion of a battery cell adjacent to a body portion of the battery cell, the apparatus comprising:

a plurality of pairs of press rollers arranged in a moving direction of the battery cell, wherein each pair of the press rollers having a gap, wherein the first pair of the press rollers has a gap to receive the sealing portion of the battery cell and the gap of each subsequent pair of rollers is gradually reduced for applying a gradually increasing pressure on the sealing portion for urging the sealing portion closer to the body portion of the battery cell, wherein each pair of the press rollers includes an upper roller and a lower roller arranged to face each other, and wherein an axis of rotation of the upper roller is inclined with respect to an axis of rotation of the lower roller.

* * * * *